(12) United States Patent
Usui

(10) Patent No.: US 7,197,136 B1
(45) Date of Patent: Mar. 27, 2007

(54) DIGITAL PORTABLE TELEPHONE SET

(75) Inventor: Hisayoshi Usui, Saitama (JP)

(73) Assignee: NEC Corporation, Tokyo (JP)

( * ) Notice: Subject to any disclaimer, the term of this patent is extended or adjusted under 35 U.S.C. 154(b) by 987 days.

(21) Appl. No.: 09/595,494

(22) Filed: Jun. 15, 2000

(30) Foreign Application Priority Data

Jun. 23, 1999 (JP) .................................. 11/176170

(51) Int. Cl.
*H03D 3/00* (2006.01)

(52) U.S. Cl. ................................. 379/387.01; 329/304

(58) Field of Classification Search ........... 379/387.01; 375/327
See application file for complete search history.

(56) References Cited

U.S. PATENT DOCUMENTS 5,793,250 A * 8/1998 Fukushi ..................... 329/307

FOREIGN PATENT DOCUMENTS

| CN | 1161605 A | 10/1997 |
|---|---|---|
| EP | 0 449 146 | 10/1991 |
| EP | 0 464 814 | 1/1992 |
| EP | 0 606 163 | 7/1994 |
| EP | 0 794 638 | 9/1997 |
| JP | 57-164645 | 10/1982 |
| JP | 3-188737 | 8/1991 |
| JP | 6-205062 | 7/1994 |
| JP | 06-268696 | 9/1994 |
| JP | 0 7183927 | 7/1995 |
| JP | 7-183927 | 7/1995 |
| JP | 07-264009 | 10/1995 |
| JP | 7-297779 | 11/1995 |
| JP | 08-139663 | 5/1996 |
| JP | 8-167832 | 6/1996 |
| JP | 07-242260 | 9/1996 |

OTHER PUBLICATIONS

Sandeep Chennakeshu, et al. "Differential Detection of pi/4 Shifted-DQPSK for Digital Cellular Radio," 1991 IEEE, pp. 186-191.

* cited by examiner

*Primary Examiner*—Sinh Tran
*Assistant Examiner*—Walter F Briney, III
(74) *Attorney, Agent, or Firm*—Scully, Scott, Murphy & Presser, P.C.

(57) ABSTRACT

Phase data 129 of received signal is fed through a one symbol delaying unit 141 and a second substracter 1 to a second decoder 2 for decoding to generate quality data 133*c*. The quality data 133*c* is computationally processed to detect frequency deviation. The quality data 133*b* is obtained by decoding in a first decoder 142 through the one symbol delaying unit 141, a correcting circuit 144 and a first decoder 142. The quality data 133*b* is used for line control.

15 Claims, 8 Drawing Sheets

FIG.4 - PRIOR ART -
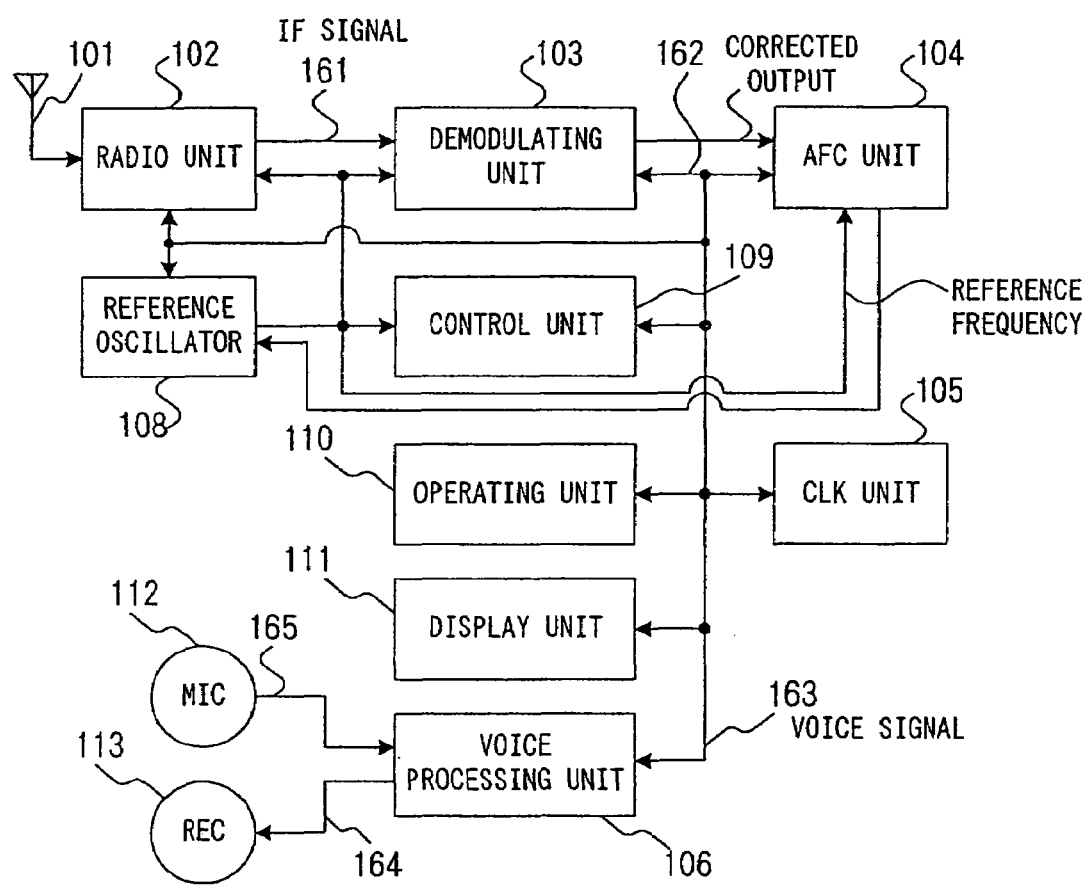

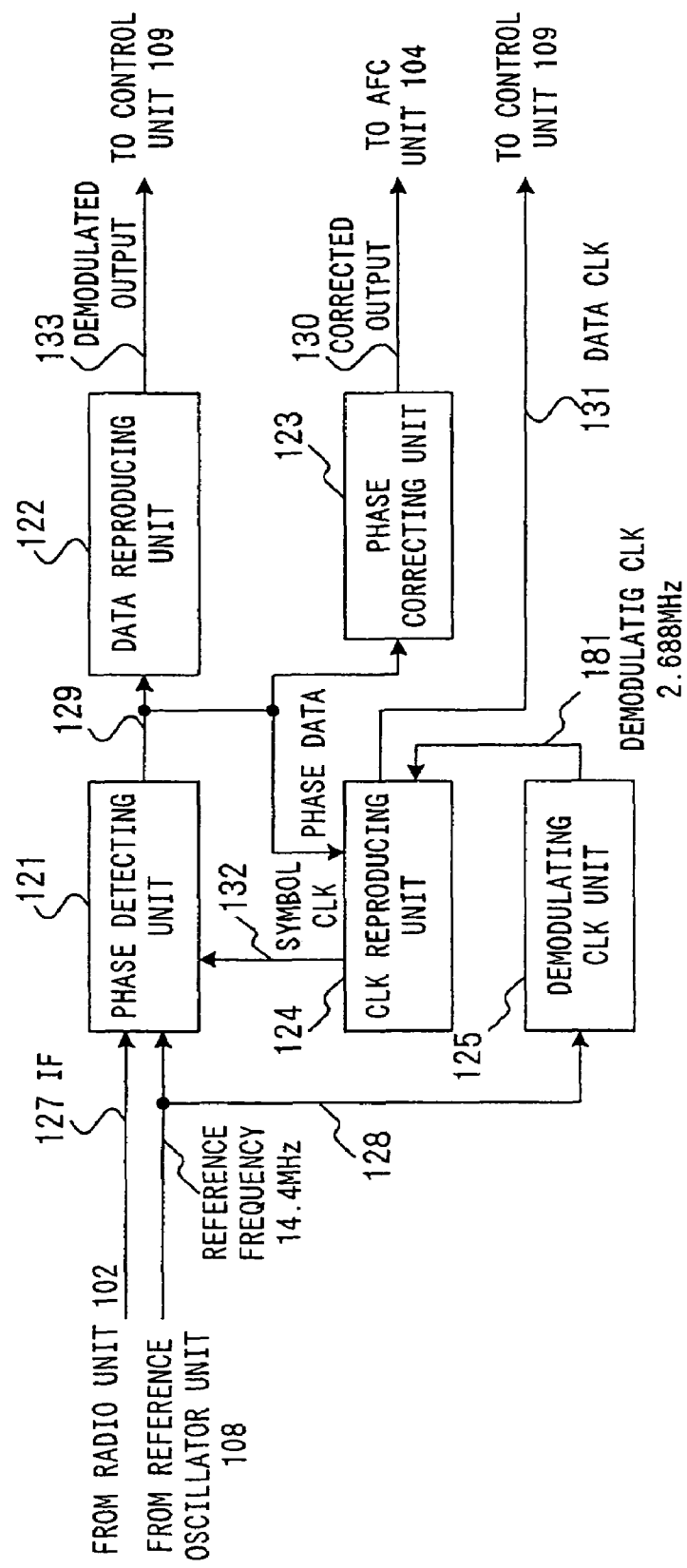
FIG.5  — PRIOR ART —

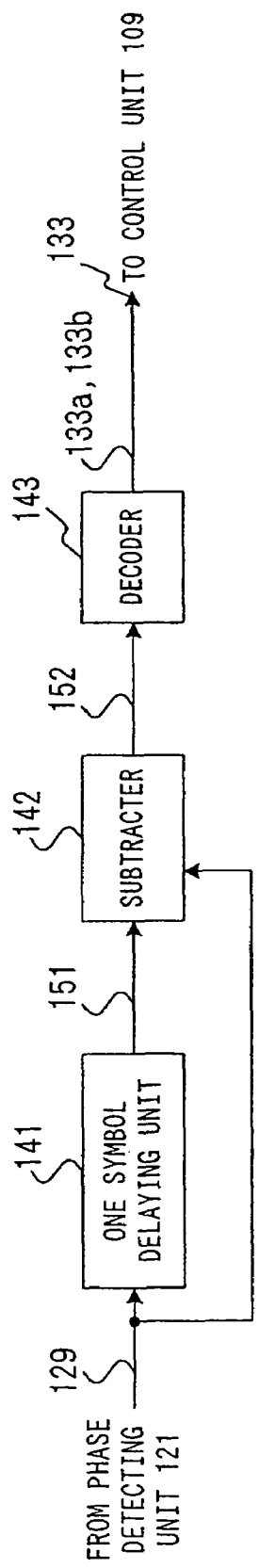
FIG.6 - PRIOR ART -

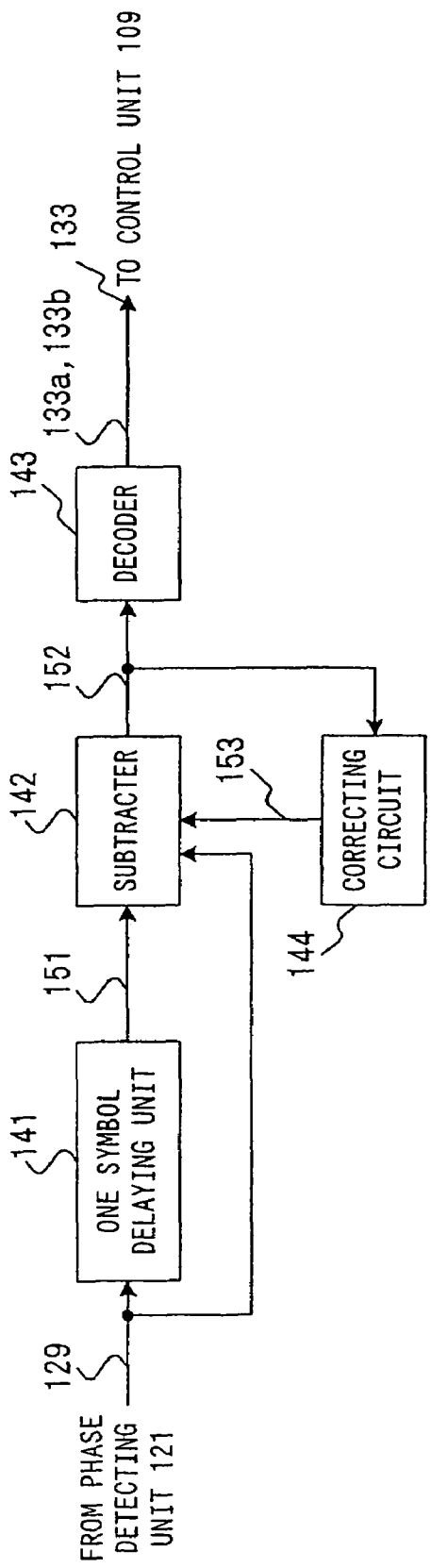
FIG.7 - PRIOR ART -

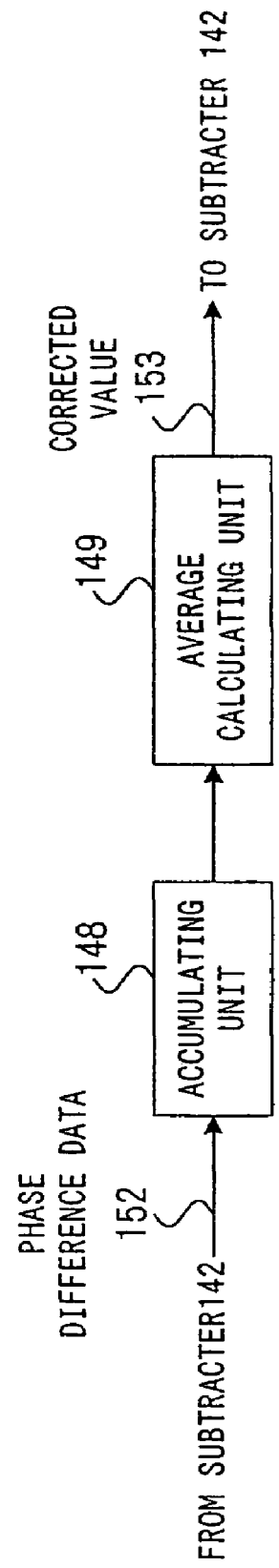
FIG.8  - PRIOR ART -

DIGITAL PORTABLE TELEPHONE SET

BACKGROUND OF THE INVENTION

The present invention relates to digital portable telephone sets and, more particularly, to digital portable telephone sets having a frequency deviation judging function.

FIG. 4 is a schematic a prior art example of digital portable telephone set. The illustrated digital portable telephone set comprises an antenna 101, a radio unit 102, a demodulating unit 103, an automatic frequency control unit (hereinafter referred to as AFC unit) 104, a clock generating unit (hereinafter referred to as CLK unit) 105, a voice processing unit 106, a reference oscillator 108, a control unit 109, an operating unit 110, a display unit 111, a microphone (MIC) 112 and a receiver (REC) 113.

In this digital portable telephone set, the radio unit 102 selects a signal frequency desired to be received from signal received by the antenna 101, and executes frequency conversion and amplification to provide an intermediate frequency signal (hereinafter referred to as IF signal) 161. The demodulator 103 demodulates the IF signal 161, and provides received data 162. The control unit 109 processes the received data 162, and provides a voice signal 163. The voice processing unit 106 converts the voice signal 163 to an analog signal to produce the voice through the receiver 113.

The voice processing unit 106 converts voice 165 inputted from the microphone 112 to a digital signal, and the control unit 109 processes this digital data to provide transmission data. The radio unit 102 modulates the transmission data to generate a carrier wave at a prescribed frequency, and amplifies the generated carrier wave. The amplified carrier wave is transmitted from the antenna 101.

The operating unit 110 is provided for inputting telephone number and other data, and it transfers the input data to the control unit 109. The display unit 111 displays various items. The CLK unit 105 generates a clock for timing processing, time instant display and so forth. The reference oscillator 108 generates a reference frequency used in a frequency generating unit in the radio unit 102 and an exact frequency used in the control unit 109 and the demodulating unit 103. The AFC unit 104 controls the reference oscillator 108 to obtain a frequency thereof identical with the exact frequency of the base station, which the signal is received from.

The demodulating unit 103 will now be described. The digital portable telephone system adopts π/4 shift DQPSK (Differential Quadrature Phase Shift Keying) as modulating system. As this demodulating system, an example of demodulating circuit in a delay detection system, which is usually used in the digital portable telephone set, is shown in FIG. 5. FIG. 5 is a block diagram showing the example of the demodulating circuit in the delay detection system. This demodulating circuit is well known, and is not described in detail here.

Referring to FIG. 5, the demodulating unit 103 includes a phase detecting unit 121, a data (DATA) reproducing unit 122, a phase correcting unit 123, a clock reproducing unit (hereinafter referred to as CLK reproducing unit) 124 and a demodulating clock unit 125.

The phase detecting unit 121 provides an IF (intermediate frequency) signal from the radio unit 102 as phase data 129 under control of a clock of the reference frequency (or instance 14.4 MHz) 128 at a timing of symbol clock 132. The data reproducing unit 122 produces received data 133 from the phase data 129, and provides the generated received data 133.

The phase correcting unit 123 corrects the phase of the phase data 129, and provides a phase-corrected IF signal 130, which is used in the AFC unit 104. The demodulating CLK unit 125 has a PLL (Phase-Locked Loop) circuit construction, and provides a demodulating clock 181 (at 2.688 MHz, for instance) by using the reference frequency 128. The CLK reproducing unit 124 divides the frequency of the demodulating clock 181 to ¹⁄₁₂₈ to provide symbol clock 132 (at 21 kHz, for instance) and also to ¹⁄₆₄ to provide data clock (at 42 kHz, for instance). Also, according to the difference between the phase shits in the first and second symbol intervals of the phase data 129, the unit 123 adjusts the phase timing of the symbol and data clocks 132 and 131 to be coincident with the symbol timing of the IF signal 127.

Features of the data reproducing unit 122 will now be described. FIG. 6 is a block diagram showing a first prior art example of data detecting circuit 122 used in a prior art delay detecting circuit. This prior art example is disclosed in detail in Japanese Patent Laid-Open No. 3-188737, and it is not described here in detail.

A one symbol delaying unit 141 delays the phase data 129 from the phase detecting unit 121 by one symbol. A subtracter 142 subtracts delayed phase-data 151 obtained by one symbol delaying and the phase data 129 from each other, and provides the difference as 5-bit phase difference data. A decoder 143 decodes the phase difference data 152, and converts the upper two bits and lower three bits of the result of decoding to received data 133a and quality data 133b, respectively. The received data 133a and quality data 133b are fed put as demodulation data 133 to the control unit 109.

Of the demodulation data 133, the quality data 133b is computationally processed in the control unit 109 for being used as frequency deviation detecting means. When the frequency deviation exceeds a predetermined value, the control unit 109 operates the AFC unit 104. The control unit 109 further computationally processes the quality data 133b to generate quality data of the receiving line. The quality data is used as data means for line control in the portable telephone system.

However, the first prior art example of data reproducing unit 122 used in the prior art delay detecting circuit, has a drawback that even a slight deviation of the received frequency results in receiving sensitivity deterioration and error factor deterioration. To cope with this drawback, a second prior art example of data reproducing unit 122 as shown in FIG. 7 is sometimes used. FIG. 7 is a block diagram showing the second prior art example of data reproducing unit 122.

The second prior art example of data reproducing unit 122 shown in FIG. 7 has a feature that it can obtain good received frequency and is free from error factor deterioration irrespective of received frequency deviation. The principles underlying this second prior art example are described in detail in Japanese Patent Laid-Open No. 57-164645, and are not described here. The circuit construction of this example is described in detail in Japanese Patent Laid-Open No. 7-183927 and Japanese Patent Laid-Open No. 6-205062, and is not described in detail here.

The difference of the second prior art example shown in FIG. 7 from the first prior art example shown in FIG. 6 is as follows. In the prior art example 2, a correcting circuit 144 receives lower three bits (corresponding to quality data 133b) of phase difference data 152 provided from a subtracter 142, and calculates a phase difference due to the frequency deviation. The circuit 144 feeds the phase difference thus obtained as correcting value 153 back to the subtracter 142. On the other hand, in the first prior art example, no such process as feeding out lower three bits of the phase difference data 152 to the correcting circuit 144 is executed.

FIG. 8 shows the construction of the correcting circuit 144 in the data reproducing unit 122. Referring to the Figure, the correcting circuit 144 includes an accumulating unit 148 and an average calculating unit 149. The accumulating unit 148 accumulates lower three bits of the phase difference data 152 a number of symbol times, and feeds out the result of accumulation to the average-calculating unit 149. The average calculating unit 149 calculates average data in a fixed symbol times number section, thereby feeding out the correcting value 153 to the subtracter 142.

However, the second prior art example of data reproducing unit 122 has a drawback that it is incapable of computing the frequency deviation from the quality data 133b outputted from the decoder 143. In other words, although this example has an advantageous feature that frequency deviation does not result in the received frequency deterioration or error factor deterioration, because the numerical value of the quality data 133b is not changed irrespective of frequency deviation, the control unit 109 can not detect frequency deviation by computing the quality data 133b. Consequently, the AFC unit 104 can not be started despite the fact that the frequency is deviated.

In the mean item, techniques concerning the AFC circuit are disclosed in Japanese Patent Laid-Open No. 7-297779 (hereinafter referred to as Literature 1) and Japanese Patent Laid-Open No. 8-167832 (hereinafter referred to as Literature 2), techniques concerning the demodulating system are disclosed in the Japanese Patent Laid-Open No. 3-188737 (hereinafter referred to as Literature 3), and techniques concerning automatic frequency deviation compensation are disclosed in the Japanese Patent Laid-Open No. 57-164645 (hereinafter referred to Literature 4). These literatures 1 to 4, however, disclose no means for solving the problems disclosed above.

SUMMARY OF THE INVENTION

An object of the present invention is to provide a digital portable telephone set capable of preventing received frequency deterioration and error factor deterioration in case of a received frequency deviation, and detecting a received frequency deviation, if any, to start the AFC unit for automatic frequency control, thus permitting satisfactory communication to be continued.

According to an aspect of the present invention, there is provided a digital portable telephone set having demodulating means for demodulating a received signal, wherein: the demodulating means includes data reproducing means, the data reproducing means having first data generating means for generating first quality data on the basis of the received signal, and second data generating means for generating second quality data different from the first quality data on the basis of the received signal.

The first quality data includes received signal frequency data. The second quality data does not include the received signal frequency data. The second data generating means further generates received data on the basis of the received signal.

The digital portable telephone set further comprises automatic frequency control means for automatically controlling the received signal frequency on the basis of the first quality data. The second data generating means includes a correcting circuit for correcting the received signal frequency data, and a decoder for generating the second quality data and the received data on the basis of new frequency data obtained in the correcting circuit. The correcting circuit corrects a frequency deviation of the received signal. The second quality data is used as line control data.

According to another aspect of the present invention, there is provided a digital portable telephone set having demodulating means for demodulating a received signal, wherein: the demodulating means includes data reproducing means, the data reproducing means having correcting means for correcting frequency data of the received signal, and data generating means for generating quality data on the basis of new frequency data obtained in the correcting means, corrected data obtained in the correcting means being used for received signal frequency control.

The quality data includes received signal frequency data. The data generating means generates received data on the basis of the new frequency data. The digital portable telephone set further comprises automatic frequency control means for automatically controlling the received signal frequency according to the corrected data obtained in the correcting means. The correcting means corrects frequency deviation of the received signal. The quality data is used as line control data.

According to other aspect of the present invention, there is provided a digital portable telephone set a digital portable telephone set including means for demodulating a received signal and reproducing data with control means for line control in the portable telephone set comprising: a phase detecting unit for providing an IF signal from as phase data under control of a clock of the reference frequency at a timing of symbol clock; a one symbol delaying unit for delaying the phase data by one; a first subtracter for obtaining a first difference signal between the phase data and the delayed signal by the one symbol delaying unit; a second subtracter for obtaining a second difference signal between the phase data and the delayed signal by the one symbol delaying unit on the basis of a correction signal; a correcting means for producing the correction signal on the basis of the first difference signal; a first decoder for decoding the first difference signal to produce the received data and a first quality data of a reception line; and a second decoder for decoding the second difference signal to produce a second quality data of the reception line.

According to still other aspect of the present invention, there is provided a digital portable telephone set including means for demodulating a received signal and reproducing data, comprising: a phase detecting unit for providing an IF signal from as phase data under control of a clock of the reference frequency at a timing of symbol clock; a one symbol delaying unit for delaying the phase data by one; a subtracter for obtaining a difference signal between the delayed phase data obtained by one symbol delaying unit and the phase data on the basis of a correction signal; a decoder for decoding the difference signal to produce the received data and a quality data of a receipt line; a correcting means for producing the correction signal on the basis of the difference signal and supplying the correction signal.

Other objects and features will be clarified from the following description with reference to attached drawings.

BRIEF DESCRIPTION OF THE DRAWINGS

FIG. 4 is a schematic a prior art example of digital portable telephone set;

FIG. 5 is a block diagram showing the example of the demodulating circuit in the delay detection system;

FIG. 6 is a block diagram showing a first prior art example of data detecting circuit used in a prior art delay detecting circuit;

FIG. 7 is a block diagram showing the second prior art example of data reproducing unit; and FIG. 8 shows the construction of the correcting circuit in the data reproducing unit 122.

PREFERRED EMBODIMENTS OF THE INVENTION

Preferred embodiments of the present invention will now be described with reference to the drawings.

Figure 1:
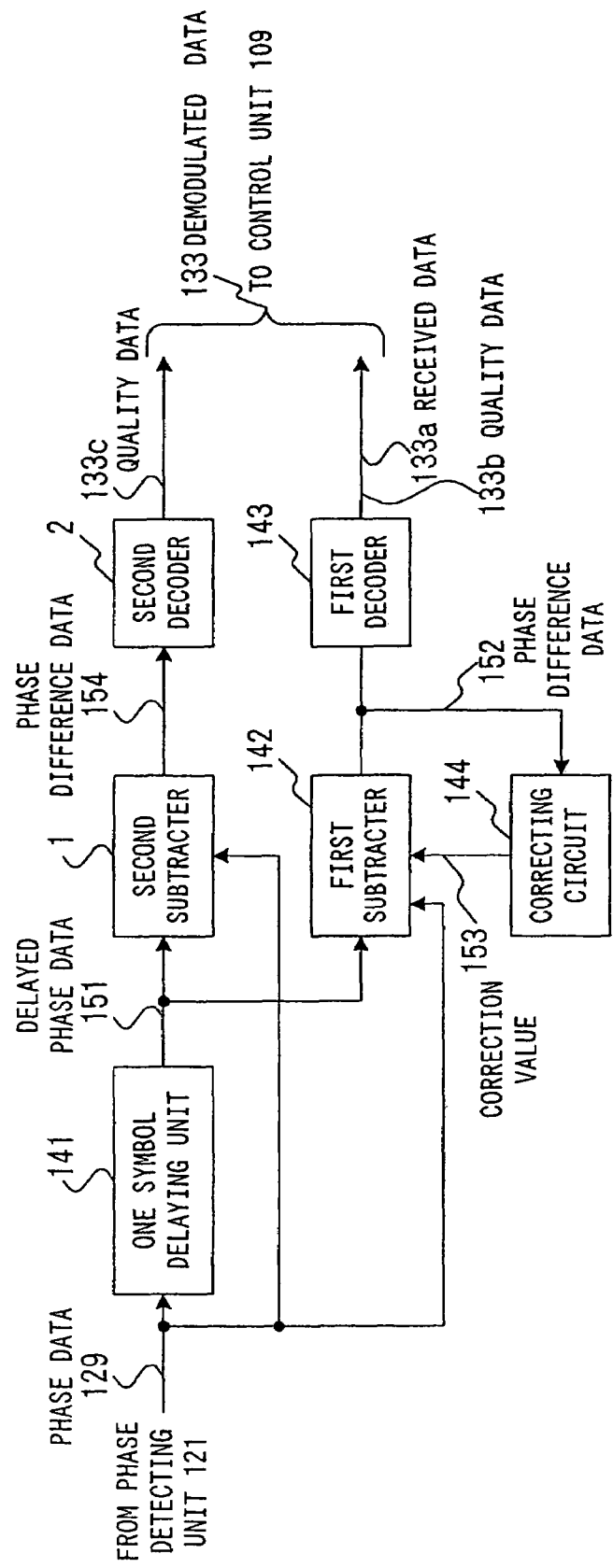
FIG. 1 is a block diagram showing a first embodiment of the digital portable telephone set according to the present invention.

FIG. 1 is a block diagram showing a first embodiment of the digital portable telephone set according to the present invention. In FIG. 1, only the construction of a data reproducing unit in the digital portable telephone set is shown for the sake of convenience. This is so because the features of the present invention reside in the construction of the data reproducing unit. The construction of the digital portable telephone set which is like that in the prior art (see FIG. 4) and the construction of the demodulating unit (see FIG. 5) are not shown, and also their operations are not described.

Referring to FIG. 1, a data reproducing unit 122 according to the present invention comprises a one symbol delaying unit 141, a first subtracter 142, a first decoder 143, a correcting circuit 144, a second subtracter 1 and a second decoder 2.

The correcting circuit 144 is connected to the first subtracter 142. The first subtracter 142 feeds out its output (i.e., first phase difference data) 152 to the first decoder 142. The first decoder 143 transfers upper two bits and lower three bits of its input as received data 113a and quality control data 132b, respectively, to control unit 109. The control unit 109 executes a computational process on the quality data 133b in the demodulation data 133 to generate quality data of the receiving line. The unit 109 makes the quality data 133b to be data means for line control in the portable telephone set.

This circuit is the same in construction as the second prior art example (see FIG. 7), and its output thus has the same features as in the second prior art example. The received data thus has good receiving sensitivity and is free from error factor deterioration irrespective of frequency deviation.

Furthermore, the second subtracter 1 in this circuit is free from any correcting circuit, and its output (i.e., second phase difference data 154) is fed out to the second decoder 2. The second decoder 2 converts lower three bits of its input to quality data 133a, and transfers this data as demodulation data 133 together with the received data 133a and quality data 133b to the control unit 109.

The quality data 133c is obtained with the same circuit construction as the first prior art example (see FIG. 6), and thus it has the same features as the quality data 133b in the first prior art example. In other words, the value of the quality data 133c is changed by a frequency deviation. The controller 109 thus can check frequency deviation by computationally processing the quality data 133c, and it can drive the AFC unit 104.

Figure 2:
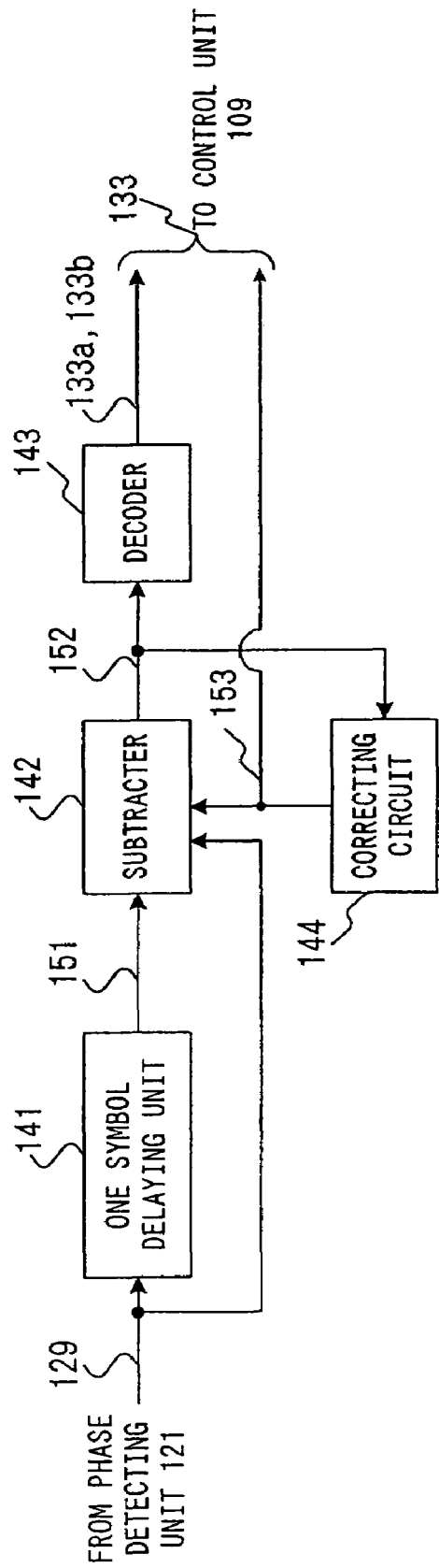
FIG. 2 is a block diagram showing the second embodiment of the digital portable telephone set according to the present invention.

A second embodiment of the present invention will now be described. FIG. 2 is a block diagram showing the second embodiment of the digital portable telephone set according to the present invention. In FIG. 2, again only the construction of data reproducing unit in the digital portable telephone set is shown for the sake of convenience. This is so for the same reason as in the first embodiment.

The first embodiment has the subtracters and decoders dually, and it is thus correspondingly complicated in construction. The second embodiment improves this drawback, and features a simpler circuit construction. Referring to FIG. 2, the second embodiment comprises a one symbol delaying unit 141, a subtracter 142, a decoder 143 and a correcting circuit 144.

As is seen, the second embodiment is the same in construction and the second prior art example (see FIG. 7). A difference resides in the output of the correcting circuit 144. Specifically, this embodiment is different from the second prior art example in that corrected value 153, i.e., output of the correcting circuit 144, is transferred as demodulation data 133 together with the received data 133a and quality data 133b to control unit 109.

Figure 3:
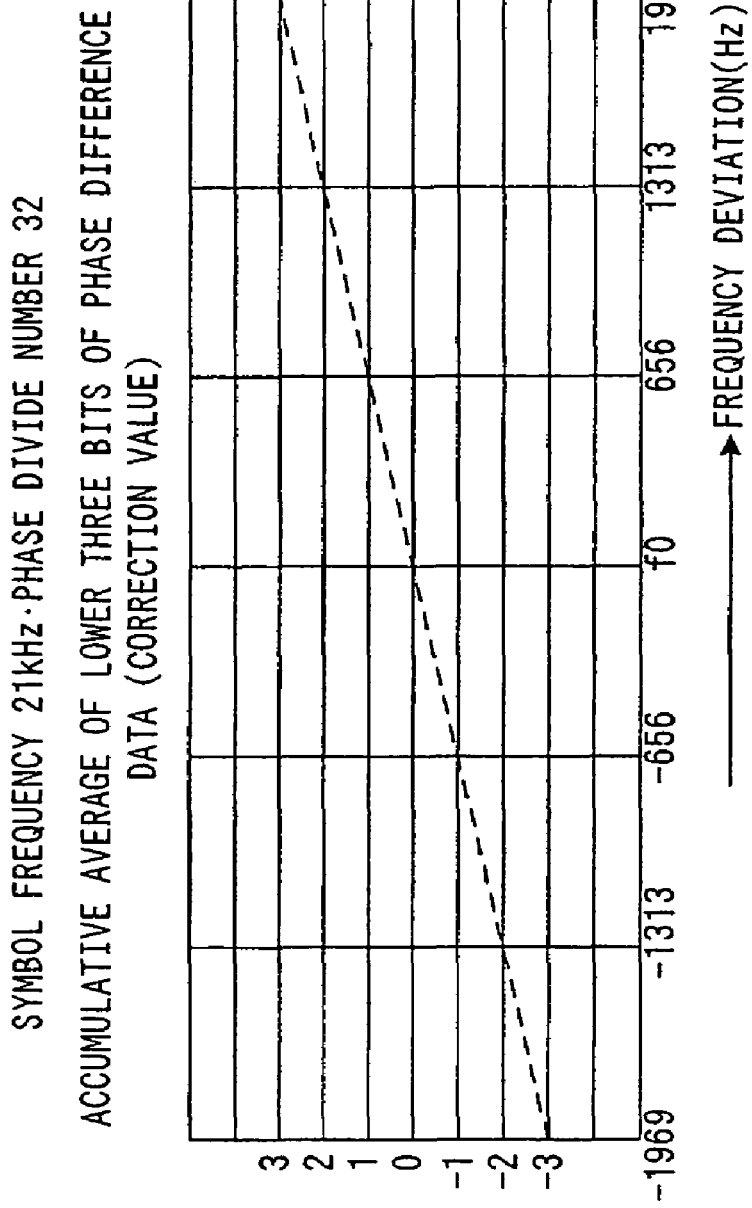
FIG. 3 shows the relation between the accumulative average of the lower three bits of the phase difference data, i.e., "corrected value", and the frequency deviation.

The corrected value 153 features in its change with a frequency deviation. FIG. 3 shows the relation between the accumulative average of the lower three bits of the phase difference data, i.e., "corrected value", and the frequency deviation. From the Figure, it will be seen that the phase difference data lower three-bit accumulative average, i.e., "corrected value", and the frequency deviation (in Hz) are proportional to each other. That is, the frequency deviation (in Hz) can be determined when the phase difference data lower three-bit accumulative average, i.e., "corrected value", is determined. In this embodiment, this feature is made use of. Specifically, the control unit 109 detects the frequency deviation by computing the corrected value 153, and then starts the AFC unit 104.

As has been described in the foregoing, in the digital portable telephone set having demodulating means for demodulating received signal, the demodulating means includes data reproducing means, which has first data generating means for generating first quality data on the basis of the received signal and second data generating means for generating second quality data different from the first quality data on the basis of the received signal. It is thus possible to provide data for computing the frequency deviation together with the quality data. Thus, it is possible to prevent the receiving sensitivity deterioration or error factor deterioration irrespective of the received frequency deviation. Also, by detecting a received frequency deviation, if any, the AFC unit can be started for automatic frequency control to permit satisfactory communication to be continued.

Furthermore, in the digital portable telephone set having demodulating means for demodulating received signal according to a different aspect of the present invention, the demodulating means includes data reproducing means, which has correcting means for correcting frequency data of the received signal and data generating means for generating quality data according to the frequency data obtained in the correcting means, and the corrected value obtained in the correcting means is provided for received frequency control. It is thus possible to obtain the same effects as according to the first-mentioned aspect of the present invention.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A digital portable telephone set having demodulating means for demodulating a received signal, wherein:
   the demodulating means includes data reproducing means, the data reproducing means having first data generating means for generating first quality data on the basis of the received signal, and second data generating means for generating second quality data different from the first quality data on the basis of the received signal, said second data generating means also generates received data, the first data generating means and second data generating means being in parallel with each other, and said first quality data, second quality data, and the received data are transferred as demodulated data to a control unit, said control unit executes computational processing on said first and second quality data.

2. The digital portable telephone set according to claim 1, wherein the first quality data includes received signal frequency data.

3. The digital portable telephone set according to claim 1, wherein the second quality data does not include the received signal frequency data.

4. The digital portable telephone set according to claim 1, wherein the second data generating means further generates received data on the basis of the received signal.

5. The digital portable telephone set according to claim 1, which further comprises automatic frequency control means for automatically controlling the received signal frequency on the basis of the first quality data.

6. A digital portable telephone set having demodulating means for demodulating a received signal, wherein:
   the demodulating means includes data reproducing means, the data reproducing means having first data generating means for generating first quality data on the basis of the received signal, and second data generating means for generating second quality data different from the first quality data on the basis of the received signal said second data generating means also generates received data, the first data generating means and second data generating means being in parallel with each other, the second data generating means including a correcting circuit for correcting the received signal frequency data on the basis of a difference signal obtained between a phase of the received signal and a delay signal based on a correction signal and a decoder for generating the second quality data and the received data on the basis of the corrected signal frequency data obtained in the correcting circuit.

7. The digital portable telephone set according to claim 6, wherein the correcting circuit corrects a frequency deviation of the received signal.

8. The digital portable telephone set according to claim 6, wherein the second quality data is used as line control data.

9. A digital portable telephone set including means for demodulating a received signal and reproducing data with control means for line control in the portable telephone set comprising:

a phase detecting unit for providing an IF signal from as phase data under control of a clock of the reference frequency at a timing of symbol clock;

a one symbol delaying unit for delaying the phase data by one;

a first subtracter for obtaining a first difference signal between the phase data and the delayed signal by the one symbol delaying unit on the basis of a correction signal;

a second subtracter for obtaining a second difference signal between the phase data and the delayed signal by the one symbol delaying unit;

a correcting means for producing the correction signal on the basis of the first difference signal;

a first decoder for decoding the first difference signal to produce the received data and a first quality data of a reception line; and a second decoder for decoding the second difference signal to produce a second quality data of the reception line, wherein the first decoder and second decoder being in parallel with each other.

10. The digital portable telephone set according to claim 9, wherein the second quality data includes received signal frequency data.

11. The digital portable telephone set according to claim 9, wherein the first decoder generates received data on the basis of the new frequency data.

12. The digital portable telephone set according to claim 9, which further comprises automatic frequency control means for automatically controlling the received signal frequency according to the second quality data.

13. The digital portable telephone set according to claim 9, wherein the correcting means corrects frequency deviation of the received signal.

14. The digital portable telephone set according to claim 9, wherein the first quality data is used as line control data.

15. A digital portable telephone set including means for demodulating a received signal and reproducing data, consisting of:

a phase detecting unit for providing an IF signal from as phase data under control of a clock of the reference frequency at a timing of symbol clock;

a one symbol delaying unit for delaying the phase data by one;

a subtracter for obtaining a difference signal between the delayed phase data obtained by one symbol delaying unit and the phase data on the basis of a correction signal;

a decoder for decoding the difference signal to produce the received data and a quality data of a receipt line; and a correcting means for producing the correction signal on the basis of the difference signal and supplying the correction signal to said subtracter and to a control unit.

* * * * *